United States Patent [19]
Jacobs

[11] 3,931,955
[45] Jan. 13, 1976

[54] BUTTERFLY VALVE

[75] Inventor: Christianus Jacobs, Bergen op Zoom, Netherlands

[73] Assignee: B.V. Machinefabriek en Ijzergieterij Holland-Bergen op Zoom, Bergen op Zoom, Netherlands

[22] Filed: Mar. 25, 1974

[21] Appl. No.: 454,427

[30] Foreign Application Priority Data
Apr. 12, 1973  Netherlands............... 7305162

[52] U.S. Cl............................. 251/305; 251/173
[51] Int. Cl.².................. F16K 1/276; F16K 25/00
[58] Field of Search........... 251/305, 308, 306, 304, 251/298, 299, 301, 302, 228, 87, 173

[56] References Cited
UNITED STATES PATENTS

| | | | |
|---|---|---|---|
| 926,174 | 6/1909 | Clark | 251/308 X |
| 1,273,740 | 7/1918 | Clark | 251/308 X |
| 3,809,361 | 5/1974 | Pfundstein | 251/173 X |
| R23,613 | 1/1953 | Danks | 251/173 |

*Primary Examiner*—Alan Cohan
*Assistant Examiner*—Robert J. Miller
*Attorney, Agent, or Firm*—Snyder, Brown and Ramik

[57] ABSTRACT

A butterfly valve comprising a housing in which a flat flap having an elastic rim is adapted to turn between a position in which the plane of the flap is parallel to the axis of the flow passage across the housing and a position in which the elastic rim is in sealing relationship to a seat arranged all around the axis of the passage across the housing, said seat having the shape of a cone surface, the apex of the cone being located outside the axis of the flow passage across the housing, wherein the sealing surface of the seat forms part of an oblique circular cone, the circular base of said cone being at right angles to the axis of the flow passage of the seat.

14 Claims, 4 Drawing Figures

BUTTERFLY VALVE

The invention relates to a butterfly valve comprising a housing in which a flat flap having an elastic rim is adapted to turn between a position in which the plane of the flap is parallel to the axis of the flow passage across the housing and a position in which the elastic rim is in sealing relationship to a seat arranged all around the axis of the passage across the housing, said seat having the shape of a cone surface, the apex of the cone being located outside the axis of the flow passage across the housing. Conical seats have been extensively used in the valve industry. Such conical seats, however, form part of straight circular cones which can easily and accurately be machined on standard machine tools. The above described conical seats, when used in butterfly valves, have certain disadvantages. In practice one has tried to overcome these disadvantages by using tilted straight circular cones. Then the axis of the cone forms an angle with the axis of the flow passage through the housing. Cross sections of such cones in planes not at a right angle to the axis of the cone are ellipses.

The invention has for its object to provide a valve of the aforesaid type in which a very satisfactory bilateral seal is obtained and which can be closed satisfactorily in spite of any play in the axis of rotation since the flap is turned somewhat more tightly.

According to the invention the sealing surface of the seat forms part of an oblique circular cone, the circular base of said cone being at right angles to the axis of the flow passage of the seat. This construction of the seat permits of using a circular flap, which can therefore be manufactured in a simple manner and according as the flap is turned on more tightly, the deformation of the flap and hence the sealing force increases at the points located outside the axis of rotation. The further said points are spaced from the axis of rotation of the flap, the greater is the increase in deformation, whereas near the axis of rotation of the flap the deformation remains substantially constant.

According to the invention the flap may be circular with a diameter equal to the diameter of the mean circular cross section of the seat plus an excess measure. Since the flap has a circular shape, its manufacture can be carried out in a simple manner.

In an efficcious embodiment of the valve in accordance with the invention the apex of the cone is located on a perpendicular line at a point of the circumferential rim to the base of the cone.

Finally, in accordance with the invention, the axis of rotation of the flap may be at right angles to the plane going through the apex of the cone and the axis of the current passage of the housing.

The invention will now be described more fully with reference to an embodiment shown in the drawing.

Figure 1:
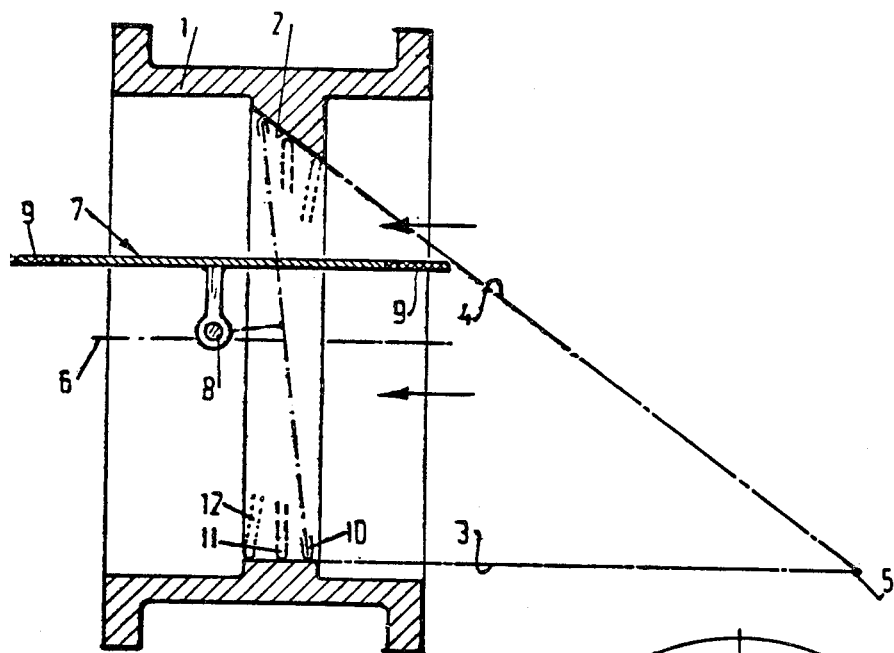
FIG. 1 is a longitudinal sectional view of the housing of a valve embodying the invention, the flap being illustrated in different positions.
Figure 2:
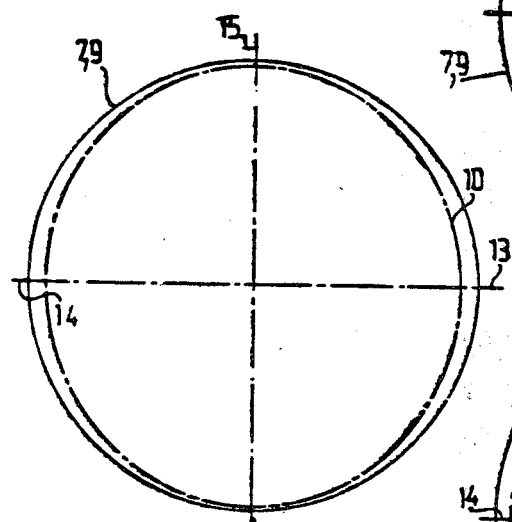
FIG. 2 is a sectional view taken in the plane of the flap in a first position (10)
Figure 3:
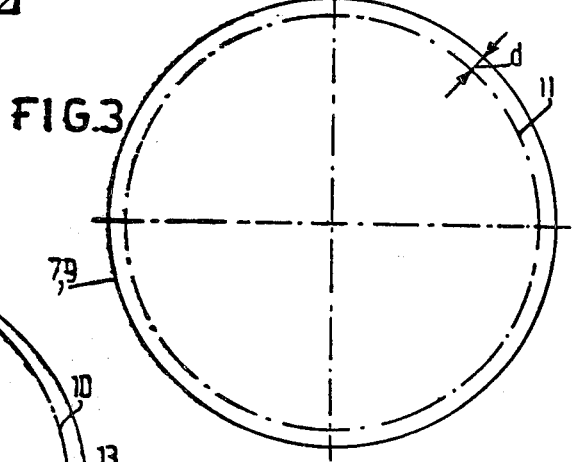
FIG. 3 is a sectional view similar to that of FIG. 2 of the flap in a different position (11)
Figure 4:
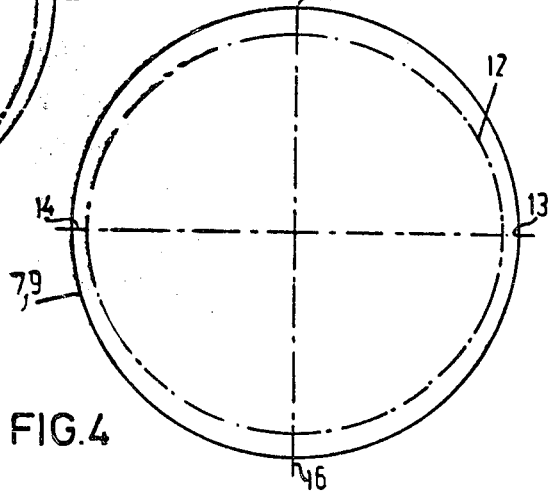
FIG. 4 is a sectional view like FIG. 2 of the flap in a further different position (12).

Referring now to FIG. 1, there is shown the housing 1 of a valve embodying the invention. The housing 1 comprises a seat surface 2, which forms part of an oblique cone having a circular base. The generatrices of the cone are indicated by dot-and-dash lines 3 and 4, whereas the apex of the cone is designated by 5. The base of the cone is at right angles to the axis 6 of the section of the passage in the valve housing. The flat flap 7 is adapted to turn about an axis 8 out of the position shown, in which the plane of the flap is parallel to the axis 6 of the passage across the housing into a position in which the elastic rims 9 of the flap 7 come into contact with the seat surface 2 of the housing 1. The various positions of the flap are indicated by a solid line 10, a broken line 11 and a dotted line 12. When the flap 7 comes into contact by the rims 9 with the seat surface, the rims 9 will be deformed so that a pressure force is produced. If a certain amount of play is found in the shaft 8, this can be compensated for by turning the flap more tightly on so that at any time a satisfactory seal is ensured. The flap 7 has a circular section indicated in FIGS. 2, 3 and 4 by a full circular line. This circle illustrates the flap in the non-deformed state. In FIGS. 2, 3 and 4 it is indicated by a dot-and-dash line where the flap is in contact with the seat surface 2. The dot-and-dash line illustrates at the same time the shape of the flap deformed by the action of the pressure force. In the position 11, shown in FIG. 3, the flap engages the seat surface 2 along a circle. The diameter of the flap exceeds the diameter of the seat by $d$. This means that the flap is unilaterally compressed over a distance $d$. FIG. 2 shows that at 13 and 14 the flap is compressed also over a distance $d$, whereas at 15 and 16 this distance is smaller. Then the flap has the shape of an ellipse with a vertical long axis. From FIG. 4 it is apparent that the compression at 13 and 14 is again equal to $d$, whereas at 15 and 16 a greater compression occurs. The shape of the flap is then an ellipse having its long axis in horizontal position. From the foregoing it will be appreciated that under any condition a very satisfactory seal can be obtained, even if the pressure of the fluid tends to lift the flap from its seat.

What i claim is:

1. A butterfly valve comprising a housing in which a flat flap having an elastic rim is adapted to turn between a position in which the plane of the flap is parallel to the axis of the flow passage across the housing and a position in which the elastic rim is in sealing relationship to a seat arranged all around the axis of the passage across the housing, said seat having the shape of a cone surface, the apex of the cone being located outside the axis of the flow passage across the housing, characterised in that the sealing surface of the seat lies on the peripheral surface of the base of an oblique circular cone, the circular base of said cone being at right angles to the axis of the flow passage of the seat.

2. A butterfly valve as claimed in claim 1, characterised in that the flap has a circular shape, the diameter thereof being equal to the diameter of the mean circular section of the seat plus an excess measure.

3. A butterfly valve as claimed in claim 1 characterised in that the apex of the cone is located on a perpendicular line at a point of the circumferential rim to the base plane of the cone.

4. A butterfly valve as claimed in claim 1 characterised in that the axis of rotation of the flap is at right angles to the plane going through the apex of the cone and the axis of the passage across the housing.

5. A butterfly valve as claimed in claim 2 characterised in that the apex of the cone is located on a perpendicular line at a point of the circumferential rim to the base plane of the cone.

6. A butterfly valve as claimed in claim 2 characterised in that the axis of rotation of the flap is at right angles to the plane going through the apex of the cone and the axis of the passage across the housing.

7. A butterfly valve as claimed in claim 3 characterised in that the axis of rotation of the flap is at right angles to the plane going through the apex of the cone and the axis of the passage across the housing.

8. A gate valve construction comprising, in combination:

a valve housing having a band-like seating surface defining an axial passage for conducting fluid, said seating surface being of decreasing circular section at planes normal to the axis of said passage from one side of the seating surface to the other side thereof, whereby said seating surface lies on the peripheral surface of the base of a right circular cone having its apex offset from said axis;

a generally circular, plate-like valve member having an elastic rim adapted to seat circumferentially along a closed path against said seating surface; and pivotal mounting means connecting said valve member to said housing for defining a pivotal axis offset from the plane of said valve member and from the geometrical center thereof by respective amounts sufficient to permit said valve member to move between a seated position and an open position parallel to said axis of the passage defined by said seating surface.

9. A gate valve as defined in claim 8 wherein said seating surface is parallel to said axis of the passage at one circumferential point on said seating surface.

10. A gate valve as defined in claim 9 wherein said valve member is circular and is of a diameter substantially equal to the mean diameter of said seating surface.

11. A gate valve as defined in claim 10 wherein said pivotal axis of the valve member is at right angles to a plane containing the apex of said oblique cone and said axis of the passage defined by said seating surface.

12. A gate valve as defined in claim 8 wherein said valve member is circular and is of a diameter substantially equal to the mean diameter of said seating surface.

13. A gate valve as defined in claim 12 wherein said pivotal axis of the valve member is at right angles to a plane containing the apex of said oblique cone and said axis of the passage defined by said seating surface.

14. A gate valve as defined in claim 8 wherein said pivotal axis of the valve member is at right angles to a plane containing the apex of said oblique cone and said axis of the passage defined by said seating surface.

* * * * *